Figure 1:
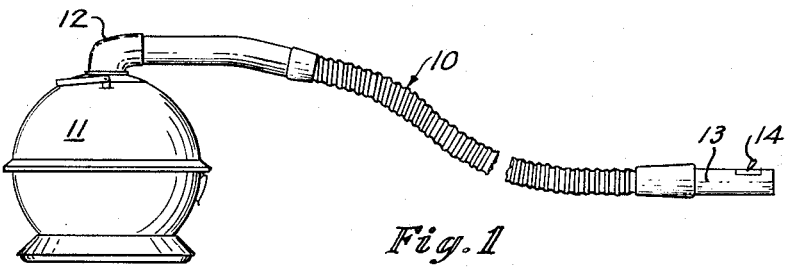

June 9, 1959

J. E. DUFF 2,890,264

ELECTRICALLY CONDUCTIVE EXTENSIBLE HOSE

Filed Dec. 21, 1956

United States Patent Office 2,890,264
Patented June 9, 1959

2,890,264

ELECTRICALLY CONDUCTIVE EXTENSIBLE HOSE

Jack E. Duff, Canton, Ohio, assignor to The Hoover Company, North Canton, Ohio, a corporation of Ohio Application December 21, 1956, Serial No. 629,871

6 Claims. (Cl. 174—47)

The present invention relates to a flexible and extensible hose and more particularly to an electrically conductive flexible extensible hose for use with a suction cleaner and to the method of making the same.

The present invention is an improvement over the hose of my prior United States Patent 2,739,616 in that, it embodies means for conducting electricity along the length of the hose so that a suction cleaner may be controlled from the end of the hose or to provide electric current at the end of the hose for operating an electrically actuated device at the hose end.

The current flowing through the hose may be from a standard 110 volt circuit but preferably, according to the present invention, the voltage is stepped down by a suitable transformer-relay so that the problem of insulation is minimized and the conductivity of the conductors may be reduced.

The hose of my prior patent is extensible lengthwise and is ultraflexible. While broadly, electrically conductive hose are old, in prior constructions the association of electric conductors with the hose did not present much of a problem, since in the prior art, the hose are not extensible, and thus, the problem of making the electric conductors extensible to the same extent as that of the hose was not present.

According to the present invention, the conductors are so associated with the hose of my prior patent as to be extensible to the same extent as is the hose.

The hose of my prior patent includes a high strength reinforcing coil coiled into a cylindrical spiral coil embraced by a thin tube of an elastomeric thermoplastic material with the turns of the coil embraced within an inwardly facing spiral fold in the tube wall and with an outwardly facing spiral fold in the tube wall lying between the coil turns inwardly thereof whereby the hose may be extended by unfolding the material of the tube wall forming the outwardly facing spiral fold.

In the hose of my prior patent the coil is prestressed so that its turns will move into substantial contact with each other when free to do so. That is not absolutely essential but the coil should be originally so stressed that its turns will move toward each other to some extent when the hose is extended and then released so that the hose will be readily extensible.

If the teaching of the prior art were to be followed it would be impossible to associate electric conductors with the hose of my prior patent and still retain its extensibility.

According to the present invention electric conductors are so associated with the hose of my prior patent as to follow the spiral contour of the inwardly facing fold in the tube wall so as to permit the unfolding of the loop portions of the outwardly facing fold when the hose is extended.

According to the present invention the coil spring of the hose of my prior patent is used as one of the conductors of an electric circuit and the second conductor of the circuit is so associated with the coil as to follow its turns so that when the coil turns are separated when the hose is extended the conductor strands are also separated whereby the extensibility of the hose is unimpaired.

According to one modification of the present invention a pair of high strength cylindrical reinforcing coils replace the single coil of my prior patent and are used to form both conductors of the electric circuit.

According to another modification of the present invention the sheath of the reinforcing coil of my prior patent is coated on the outside next to the tube wall with a coating of conductive material so that the coating forms one line of the electric circuit and the coil itself the other.

It is to be noted that in each modification the loop portions of the outwardly facing spiral fold are left free to unfold when the hose is extended without interference from the conductors.

In each of the modifications the high strength steel reinforcing elements may be copper or aluminum clad to render them more conductive.

Figure 2:
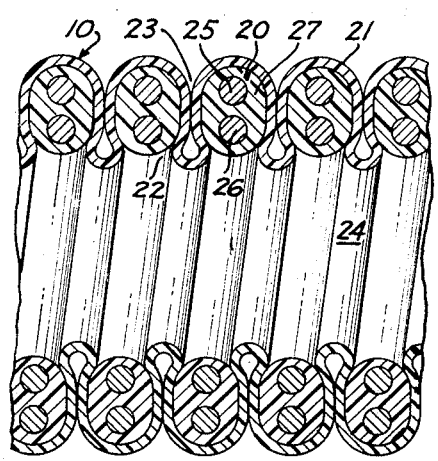
Figure 3:
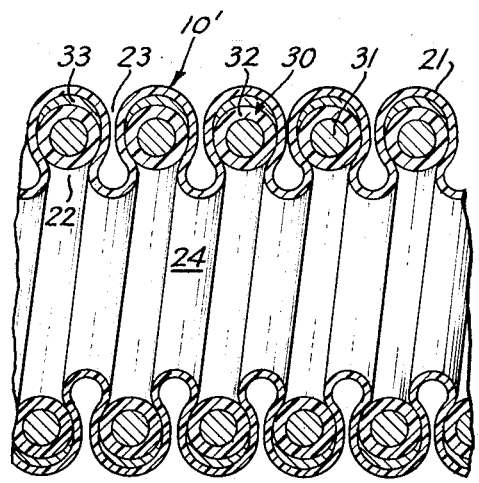
Figure 4:
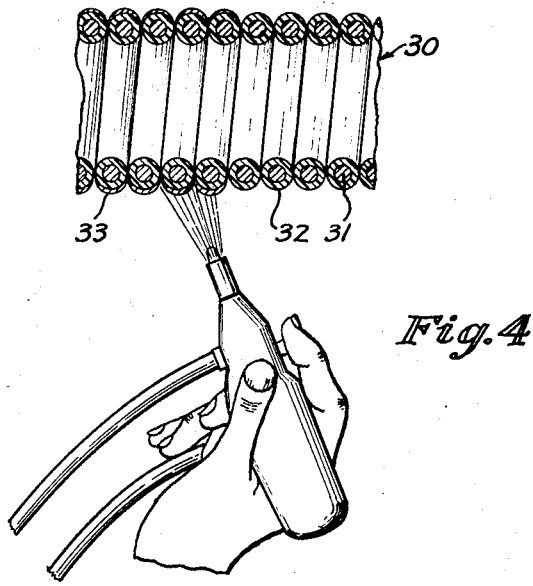

Other objects and advantages of the present invention will become apparent as the description proceeds when taken in connection with the accompanying drawings in which:

Fig. 1 is a schematic view of a suction cleaner with the hose of the present invention applied thereto, and showing one adaptation of the hose of the present invention, Fig. 2 is a longitudinal sectional view of a short length of one modification of the hose of the present invention, Fig. 3 is a view similar to that of Fig. 2 and showing a second modification of the present invention, and Fig. 4 is a view showing how the conductive reinforcing element of Fig. 3 is made.

Fig. 1 of the drawing shows the hose of the present invention applied to a suction cleaner for controlling the operation thereof from the end of the hose and is merely one adaptation of the invention.

In Fig. 1 the hose 10 is connected to the cleaner 11 by means of a swivel connection 12 which discharges into a filter bag within the cleaner 11 in a manner well known in the art. A fitting 13 is suitably attached to the free end of the hose 10 and is adapted to be attached to any suitable cleaning tool. As will presently appear the hose 10 is electrically conductive and a manually actuated switch 14 is electrically connected to the conductors forming a part of the hose 10 and is mounted on the fitting 13 for ready access by the operator. The other end of the conductors of the hose 10 may be connected to any suitable transformer-relay mounted within the cleaner 11 and electrically connected to the motor thereof. The arrangement is such that by actuating switch 14 to one position or another the motor of the cleaner may be energized or de-energized and forms an arrangement by which the cleaner 11 may be controlled from the end of the hose 10.

In the arrangement just described the transformer-relay may have its primary coil connected to a standard 110 volt circuit and its secondary connected to the conductors of hose 10 so as to reduce the voltage therein to any suitable value so as to reduce the insulation requirements of the conductors in the hose 10.

The arrangement of Fig. 1 may also be used to control the energization of any suitable electrically actuated adjunct attached to the fitting 13. In that case, at the inner end of the hose 10, the conductors of the hose 10 would be connected to a switch for controlling the motor of the cleaner 11. The switch 14 would then be electrically connected to the electrically actuated adjunct so as to be capable of energizing and de-energizing the same. In the latter case, the conductors of the hose 10 may be capable of carrying the full voltages from the standard 110 volt circuit.

The hose 10 of Fig. 2 comprises a cylindrically coiled spiral reinforcing element or coil 20 and a thin tube 21 of an elastomeric thermoplastic material such as polyvinyl chloride. The tube 21 is formed with inwardly and outwardly facing spiral folds 22 and 23 respectively. The turns of the coil 20 are embraced by the inwardly facing fold 22 while the outwardly facing spiral fold 23 lies between the turns of the coil 20 and includes loop portions 24 of slack material inwardly of the turns of the coil 20 which are adapted to unfold when the hose is extended as will be more fully explained hereinafter.

The coil 20 is formed with spaced high strength steel wires 25 and 26 sheathed within a sheath 27 of an elastomeric thermoplastic material such as polyvinyl chloride. Steel wires 25 and 26 may be copper or aluminum clad to render them more conductive.

The sheath 27 may be extruded about the wires 25 and 26 in a manner well known in the art and then coiled into a cylindrical spiral 20 in any suitable way known in the art so that its turns tend to move into contact with each other.

After the coil 20 is formed the hose 10 may be formed in various ways one of which is disclosed in my prior Patent 2,739,616. Briefly, the method disclosed in my prior patent comprises stretching the coil 20 longitudinally so that its turns are spaced apart and tend to return toward each other when free to do so. A thin tube 21 of smaller diameter than that of the coil 20 is then inflated and assembled over the stretched coil and deflated so that its walls closely embrace the coil turns and move inwardly between the coil turns to form shallow corrugations which are the genesis of the loop portions 24 of the completed hose. The coil 20 is then released and its turns move toward each other as far as permitted by the walls of the tube 21 which causes the walls of tube 21 to move further inwardly between the coil turns. The carcass thus formed is then placed in a warm water bath or otherwise heated to a temperature of from 150° to 180° F. for a few minutes which relaxes the stresses in the wall of the tube 21 and causes the turns of coil 20 to move together so as to be separated only by the walls of the tube 21 which form the loop portions 24. As the coil turns move toward each other the tube walls forming the inwardly facing fold 22 embrace the coil turns and the deep loops 24 of slack material are formed. The completed hose is then cooled to room temperature to give the tube wall a permanent set in the position shown in Fig. 2.

The coil 20 need not be close coiled to such an extent that its turns come into contact with each other but it should be so coiled that it can be stretched considerably when the tube 21 is applied. With such a construction the coil turns will be spaced apart somewhat in the finished hose and the hose will be both extensible and contractible lengthwise and will return to its normal static condition when the moving force is released.

In either case when the hose is extended the loop portions 24 will straighten out and unfold from about the coil turns up to a point adjacent the outer crest of the fold, it being noted that the tube wall is not bonded to the sheath 27.

The dimensions of the coil 20 and the tube 21 may vary widely as may the strength and size of the wires 25 and 26 depending upon the use to which the finished hose is to be put. For use with suction cleaners it has been found that the following dimensions, etc. are satisfactory. The tube 21 may be 1¼ inches in diameter, 168 to 170 inches long before being applied to the coil, 0.022 to 0.026 inch in thickness and made of polyvinyl chloride having a tensile strength of 2,000 pounds per square inch at 80° F. The springs 25 and 26 may be made of steel having a tensile strength of 275,000 pounds per square inch and each having a diameter of 0.029 inch. The sheath 27 may be of the same material as the tube 21 and having a minimum thickness of 0.010 inch. The coil 20 may be from 39 to 40 inches long when closely coiled and is stretched to over 200 inches when the tube is applied.

The hose 10' of Fig. 3 is similar to the hose of Fig. 2 in that it is extensible to substantially the same extent and is provided with electric conductors for conducting electricity along its length, one of the conductors being the reinforcing element. The formation of the tube 21 is the same as in Fig. 2 and its like parts have been given the same reference characters.

The coil 30 of Fig. 3 is in the form of a spring steel wire 31, 0.058 inch in diameter, a sheath 32, 0.010 inch thick of polyvinyl chloride and a conductive coating 33, such as aluminum, of sufficient thickness to form one of the electrical conductors for the intended use. In the drawings, the thickness of the coating 33 is shown exaggerated for clarity. It is to be noted that the coating is positioned only on the outside of the sheath 32 between the tube 21 and the coil turns.

The coating 33 is applied by spraying, as shown in Fig. 4, while the coil turns are in contact with each other so that only the outside of the coil 30 will be coated with the conductive material leaving the interior of the sheath 32 uncoated. That feature has an advantage in the completed hose since when extended the loop portions 24 do not unfold beyond the point where the coating 33 is applied so that in use the conductor 33 is completely insulated from the interior of the hose.

After the coil 30 is coated the hose is completed in the same manner as described in connection with the hose of Figure 2.

It is obvious that the reinforcing elements 25 and 26 of Figure 2 and 31 of Figure 3 may be made of a material other than steel so long as they are electrical conductors and have sufficient strength to prevent the hose from collapsing in use such as being trod upon by the user. It is preferable, however, that they be made of high strength steel clad with a more conductive material such as copper or aluminum.

From the foregoing, it can be seen that in each modification an extensible hose is formed with electrical conductors which are extensible to the same extent as the hose and in which at least one of the conductors is formed by the reinforcing element of the hose.

While I have shown and described but two modifications of my invention, it is to be understood that those modifications are to be taken as illustrative only and not in a limiting sense. I do not wish to be limited to the specific structure shown and described but wish to include all equivalent variations thereof except as limited by the scope of the claims.

I claim:

1. In a flexible and extensible hose of the type having a cylindrical spirally wound high strength reinforcing coil stressed so that its turns will move toward each other when the hose is extended and released and a thin wall tube of an elastomeric thermoplastic material embracing the turns of said coil in which said tube in its normal static contracted condition has alternate inwardly and outwardly facing spiral folds in its wall with said inwardly facing fold embracing the turns of said coil and with said outwardly facing fold lying between the turns of said coil in the form of loop portions inwardly of the turns of said coil which are free to unfold when the hose is extended, in which said coil is formed of an electrically conductive element so as to form one line of an electric circuit and a second electrical conductive element is integrally associated with the turns of said coil over the entire length of the hose to form a second line of said electrical circuit, said electrically conductive elements being insulated from each other.

2. In a hose according to claim 1 in which both of said electrically conductive elements are encased within a single extruded sheath of an elastomeric thermoplastic material.

3. In a hose according to claim 2 in which at least one of said electrically conductive elements is in the form of a stiff metallic wire which can be coiled into a close turned coil and retain a close coiled static position.

4. In a hose according to claim 1 in which each of said electrically conductive elements is in the form of a cylindrically coiled high strength steel wire which together form said reinforcing coil.

5. In a hose according to claim 4 in which said steel wires are clad with a more conductive material.

6. In a hose according to claim 1 in which said second electrically conductive element is in the form of a coating of electrically conductive material on the outside of an insulating sheath which encases said coil.

References Cited in the file of this patent

UNITED STATES PATENTS

| | | |
|---|---|---|
| 2,060,913 | Weaver | Nov. 17, 1936 |
| 2,602,608 | Darling | July 8, 1952 |
| 2,733,734 | Woodward et al. | Feb. 7, 1956 |
| 2,739,616 | Duff | Mar. 27, 1956 |